Dec. 27, 1927.
H. M. PFLAGER
1,654,141
CAR TRUCK
Filed Jan. 10, 1925
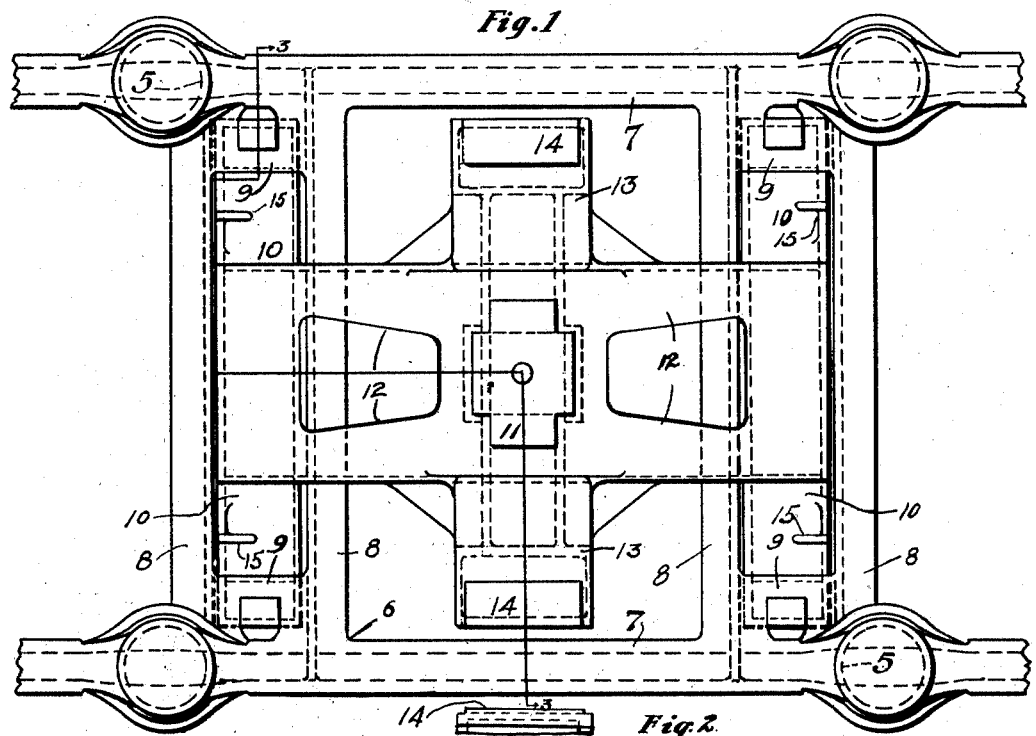
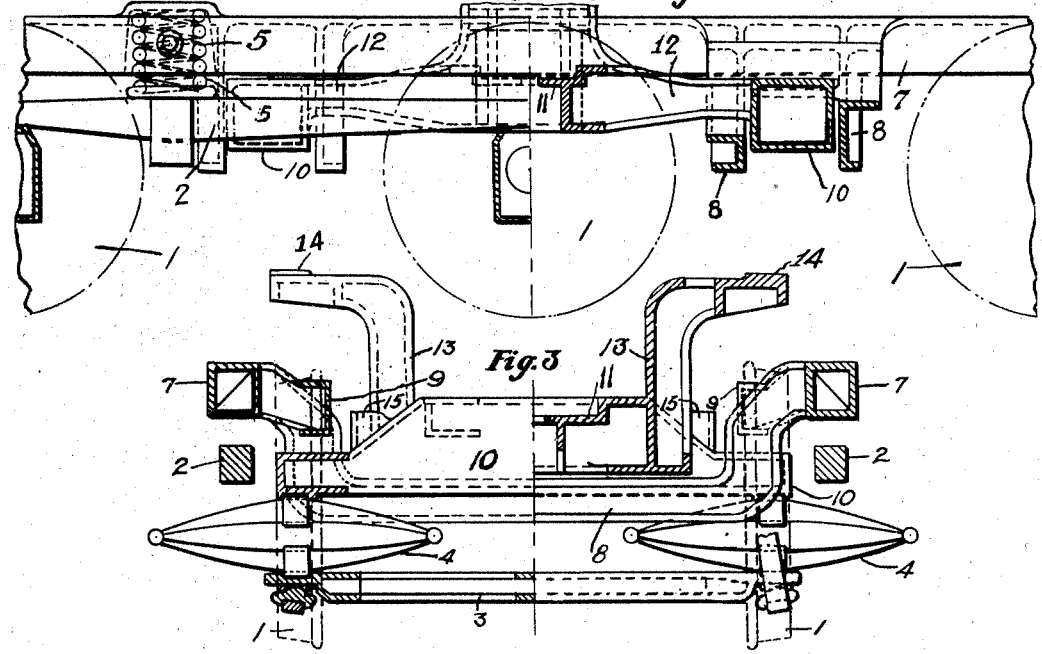
Inventor
Harry M Pflager Patented Dec. 27, 1927.

1,654,141

UNITED STATES PATENT OFFICE.

HARRY M. PFLAGER, OF ST. LOUIS, MISSOURI, ASSIGNOR TO COMMONWEALTH STEEL COMPANY, OF ST. LOUIS, MISSOURI, A CORPORATION OF NEW JERSEY.

CAR TRUCK.

Application filed January 10, 1925. Serial No. 1,614.

My invention relates to railway rolling stock and consists in an improved car truck structure and is particularly adapted for six wheel trucks in which the center support or center bolster is carried on cross bolsters which in turn are carried by spaced spring planks.

One object of my invention is to provide a bolster structure in which the cross bolsters may terminate inside of the equalizer bars, thereby increasing the vertical clearance and permitting use of cross bolsters of desirable box cross sections and eliminating the use of inverted channel or trough-shaped cross bolsters such as has heretofore been necessary when straight equalizer bars are used. This enables me to reduce the truck wheel base. I make possible the use of this type of cross bolster by providing the center bolster with truck side bearings.

Another object of my invention is to provide a bolster of the type referred to, and equipped with side bearings, which may be assembled with the truck frame from above and similarly removed.

Cars are now being built with the truck and body parts securely fastened together by means of locked pivot pins in center plates, or otherwise, as it has been found that in cases of collision where one car underframe passes beneath another, the lower underframe will pass between the car body and truck and interlock, thus preventing extension of the telescoping, and one object of my invention is to secure a similar result by so designing truck parts that the center member when in operating position is interlocked with the other truck parts, irrespective of additional elements such as pivot pins, etc., so as to prevent accidental displacement.

Another object of my invention is to provide a compact member, comprising the center bolster, side bearings and cross bolsters, which in assembling the truck, can be handled and applied as a single unit and will remain in place in the assembled truck without additional securing means, and will so interlock with other truck parts as to be free for all operating movements, and yet be held against displacement in case of accident.

Another object of my invention is to prevent the bolster dropping on to the track in case of failure of swing hangers or other supporting parts. To accomplish this, the parts are so designed that some members of the truck-bolster overlap the truck frame transoms and in case of failure of supporting parts, the center bolster will find a bearing on the transoms.

I also desire to provide means for limiting the sideways or transverse movement of the bolster relative to the frame.

In the accompanying drawings which illustrate a selected embodiment of my invention—

Figure 1 is a top view of the major portion of a six wheel car truck including the frame and my improved center member.

Figure 2 is in part a side elevation of the structure shown in Figure 1 and in part a longitudinal vertical section through the center of the same.

Figure 3 is a transverse vertical section taken substantially on the line 3—3 of Figure 1 and also showing spring planks and bolster springs.

The truck illustrated is provided with the usual wheels 1, equalizer bars 2, spring planks 3, springs 4, equalizer springs 5, and a frame 6 supported by springs 5 and including wheel pieces 7, transoms 8, and longitudinal bridge members 9 spaced from the wheel pieces and parallel therewith.

Supported on springs 4 are the cross bolsters 10 preferably made box-shaped in cross section for maximum strength for a given weight and extending between springs 4, preferably terminating adjacent to their mounting on these springs and inside of the inner faces of equalizers 2 and wheel pieces 7. In the construction shown, the equalizers 2 are of the straight or top type and hence are positioned substantially in the same plane as cross bolsters 10.

The truck center member comprises a center support portion 11 with outwardly and downwardly extensions 12 formed thereon and supported at their outer ends by cross bolsters 10.

Since the cross bolsters terminate inside of the truck frame and the usual side bearing arch carried by the ends of cross bolsters is thereby eliminated, I provide side bearings on the center member by means of the outwardly and upwardly extending portions 13 terminating in the side bearings 14.

Preferably the cross bolsters 10, center bolster 11, arms 12 and extensions 13 of side bearings 14 are all formed in an integral one-piece casting, thereby eliminating the machining and handling of separate parts and the bolts or rivets and work required to assemble separate parts. This construction also enables me to produce a bolster member lighter in weight than an assembled structure of the same strength. However, it is not essential for the embodiment of my invention broadly for the parts mentioned to be formed integrally as they may be separately formed and united and applied as a unit to the remainder of the truck structure.

I have also illustrated as a preferred construction of the truck frame a one-piece casting, although this is not essential to my invention. In the assembled structure, it will be noted that the center member arms 12 pass over the frame inner transoms 8 and the ends of the cross bolsters 10 are positioned beneath the bridge members 9. With this arrangement the bolster member and the frame are interlocked against vertical displacement as any tendency of the bolster to separate from the frame will be checked by the engagement of the tops of the cross bolsters with the bottom of the members 9. This engagement or interlocking does not prevent the assembly or disassembly of the parts as the center member may be lowered into place by tilting one side so that the ends of the cross bolsters may be inserted under their corresponding members 9 and the bolster moved downwardly and laterally until the opposite ends of the cross bolsters may drop below the corresponding members 9, after which the center member may be moved laterally to the center of the truck and when in this position and supported by springs 4 undue shifting of the center member transversely of the truck will be prevented by shoulders 15 on the cross bolsters and longitudinal displacement by the outer transoms 8.

In my copending Patent No. 1,531,499, I show an integral center and cross bolster structure which is adapted to be assembled with the truck frame by being raised into position from below the frame, and in this disclosure the bolster arms extend beneath the frame transoms and the cross bolsters extend outwardly beneath the wheel pieces of the frame. Obviously, such structure is not adapted for use with straight or top equalizers as is my present structure. However, I do not wish to be understood as limiting the use of my present structure to a truck in which only the straight equalizers are used. Obviously, the cross bolsters may extend beyond the wheel pieces if depressed equalizers are used and if the distance between the springs 4 and the wheel pieces permit insertion of cross bolsters. These and other modifications of my invention will suggest themselves to those familiar with the art and I contemplate the exclusive use of all such features as fall within the scope of my invention as expressed in the appended claims.

I claim:

1. In a car truck, an integral frame, and a center member comprising a center bolster and side bearings and cross bolsters formed integral, the said member being held by said frame against displacement in all directions.

2. In a car truck, an integral frame, and a center member comprising a center bolster and side bearings on said bolster and cross bolsters formed integral, the said member being held by said frame against displacement in all directions.

3. In a car truck, an integral frame, spring planks supported from said frame, springs carried thereby, and an integral center member comprising a center bolster and side bearings and cross bolsters mounted on top of said springs, the said member being held by said frame against displacement in all directions.

4. In a car truck, a frame, and a center member comprising a center bolster and side bearings and cross bolsters, the said center member being applicable from above to said frame but held thereby against separation therefrom by vertical movement.

5. In a car truck, a frame, and an integral center member comprising a center bolster and side bearings and cross bolsters, the said center member being applicable from above to said frame but held thereby against separation therefrom by vertical movement.

6. In a car truck, a frame including wheel pieces and transoms connecting said wheel pieces, and a center member including a center bolster having arms extending over said transoms and having side bearings and cross bolsters, said center member being applicable, from above, as a unit, to said frame.

7. In a car truck, a frame including wheel pieces and transoms connecting said wheel pieces and transom connecting members, and an integral center member including a center bolster having arms extending over said transoms and having side bearings and cross bolsters extending under said members, said center member being applicable, from above, as a unit, to said frame.

8. In a car truck, an integral frame, and a center member comprising a center bolster and side bearings and cross bolsters and cooperating elements on the said frame and center member, respectively, to limit the movements of said member in all directions.

9. In a car truck, an integral frame, a center member comprising a center bolster with integral side bearings and cross bolsters and cooperating elements on the said frame and center member, respectively, to limit the movements of said member in all directions.

10. In a car truck, an integral frame, a center member comprising a center bolster with side bearings and cross bolsters formed integral, and cooperating elements on the said frame and center member, respectively, to limit the movements of said member in all directions.

11. In a car truck, an integral frame, an integral center member comprising a center bolster and side bearings and cross bolsters, and cooperating elements on said frame and member, respectively, to limit the vertical movements of said member.

12. In a car truck, an integral frame, an integral center member comprising a center bolster and side bearings and cross bolsters, and cooperating elements on said frame and member, respectively, to limit the horizontal movements of said member.

13. In a car truck, an integral frame, an integral center member comprising a center bolster and side bearings and cross bolsters, and cooperating elements integral with said frame and member, respectively, to limit the horizontal movements of said member.

14. In a car truck, an integral frame including longitudinal bridges, a center bolster, side bearings extending outwardly and upwardly from said bolster, and cross bolsters extending outwardly from said center bolster beneath said bridges, said center bolster, side bearings and cross bolsters being applicable to and removable as a unit from said frame.

15. In a car truck, an integral frame including longitudinal bridges and a one-piece casting comprising a center bolster with side bearings extending outwardly and upwardly therefrom and with cross bolsters extending outwardly from said center bolster beneath said bridges.

16. In a car truck, an integral frame including wheel pieces and longitudinally extending bridges spaced inwardly from said wheel pieces, a center bolster member including upwardly and outwardly extending side bearing portions and including cross bolsters extending under said bridges and terminating short of the outer faces of said wheel pieces.

17. In a car truck, an integral frame including wheel pieces and longitudinally extending bridges spaced inwardly from said wheel pieces, a center bolster member including upwardly and outwardly extending side bearing portions and including cross bolsters extending under said bridges and terminating short of the outer faces of said wheel pieces, and portions on said cross bolsters adapted to engage the sides of respective bridges to limit movement of said member transversely of the truck.

18. In a car truck, a one-piece frame including wheel pieces, equalizer bars beneath said wheel pieces, cross bolsters terminating short of said equalizer bars and lying in substantially the same horizontal plane as said equalizer bars, a center bolster carried by said cross bolsters, and side bearings carried by said center bolster, said cross bolsters, center bolster and side bearings being applicable and removable as a unit to and from the remainder of the truck structure.

19. In a car truck, a one-piece frame including wheel pieces, equalizer bars beneath said wheel pieces, cross bolsters terminating short of said equalizer bars and lying in substantially the same horizontal plane as said equalizer bars, a center bolster carried by said cross bolsters, and side bearings carried by said center bolster, said cross bolsters, center bolster and side bearings being formed as parts of a one-piece casting.

20. In a car truck, a one-piece frame including wheel pieces, equalizer bars beneath said wheel pieces, cross bolsters terminating short of said equalizer bars, a center bolster carried by said cross bolsters, and side bearings carried by said center bolster, said cross bolsters, center bolster and side bearings being applicable and removable as a unit to and from the remainder of the truck structure.

21. In a car truck, a one-piece frame including wheel pieces, equalizer bars beneath said wheel pieces, cross bolsters terminating short of said equalizer bars, a center bolster carried by said cross bolsters, and side bearings carried by said center bolster, said cross bolsters, center bolster and side bearings being formed as parts of a one-piece casting.

22. In a car truck, a frame including wheel pieces, transoms connecting said wheel pieces, and bridges parallel with and inside said wheel pieces, and a bolster member including a center support, arms thereon extending over said transoms, side bearings, and cross bolsters extending under said bridges, said member being applicable to said frame as a unit from above.

23. In a car truck, an integral frame including wheel pieces and longitudinal bridges spaced inwardly therefrom and transverse transoms, and a unit bolster structure including transverse elements which extend beneath said bridges, but not beneath said wheel pieces, and also including longitudinal elements which extend above said transoms.

24. In a car truck, an integral frame including wheel pieces and parallel longitudinal bridges spaced inwardly therefrom and transverse transoms, and a one-piece cast center bolster positioned between said wheel pieces and some of said transoms and including longitudinal elements which extend over other of said transoms and including transverse elements which extend beneath said bridges but terminate short of said wheel pieces.

25. In a car truck, an integral truck frame, spring planks supported from said frame, springs carried by said spring planks, and an integral center member comprising a center bolster and cross bolsters and side bearings carried by said center bolster independently of said cross bolsters, said cross bolsters being mounted on top of said springs, said center member being held by said frame against displacement in all directions.

26. In a car truck, a frame, and a center member comprising a center bolster and cross bolsters and side bearings carried by said center bolster independently of said cross bolsters, said center member being applicable from above to said frame but held thereby against separation therefrom by vertical movement.

27. In a car truck, a frame, and an integral center member comprising a center bolster and cross bolsters and side bearings carried by said center bolster independently of said cross bolsters, said center member being applicable from above to said frame but held thereby against separation therefrom by vertical movement.

In testimony whereof I hereunto affix my signature this 27 day of December, 1924.

H. M. PFLAGER.